Figure 1:
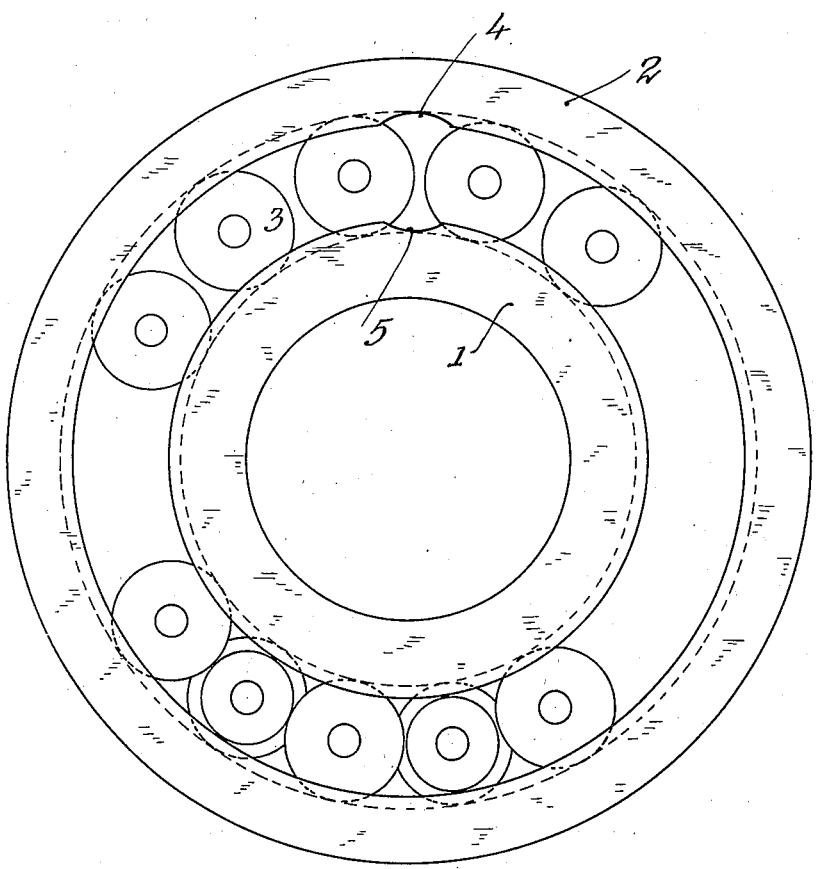

E. MEIER.
ROLLER BEARING.
APPLICATION FILED JUNE 16, 1919.

1,328,179.

Patented Jan. 13, 1920.
2 SHEETS—SHEET 1.

E. MEIER.
ROLLER BEARING.
APPLICATION FILED JUNE 16, 1919.
1,328,179.
Patented Jan. 13, 1920.
2 SHEETS—SHEET 2.
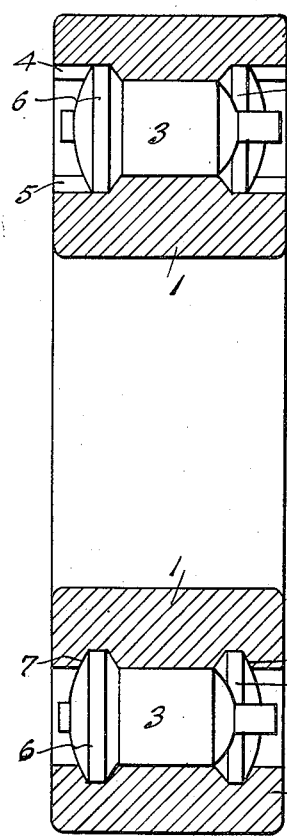
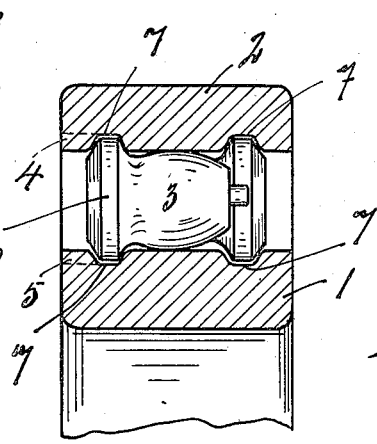
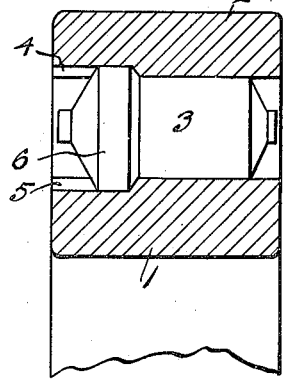
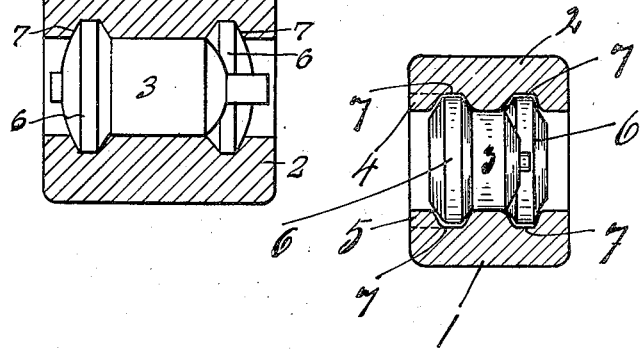
Inventor.
Erling Meier,
By Hanworth Jr
atty.

UNITED STATES PATENT OFFICE.

ERLING MEIER, OF CHRISTIANIA, NORWAY.

ROLLER-BEARING.

1,328,179.　　　　Specification of Letters Patent.　　Patented Jan. 13, 1920.

Application filed June 16, 1919. Serial No. 304,550.

*To all whom it may concern:*

Be it known that I, ERLING MEIER, of Karl Johans Gate 43, Christiania, in the Kingdom of Norway, a subject of the King of Norway, have invented certain new and useful Improvements in Roller-Bearings; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention has for its object a roller bearing of the kind where the rings have annular grooves or ribs, which serve to take up the axial pressure and correspond with ribs or grooves on the rollers.

According to the present invention the rings are made in one piece, and the rollers are introduced between the rings by means of axial grooves or notches leading from the side faces of the rings through the annular ribs or to the bottom of the grooves.

Further the invention comprises a number of constructive details which will be further described with reference to the accompanying drawings.

On the drawings Figure 1 is a view of a roller bearing according to the invention, and Figs. 2, 3, 4 and 5 illustrate axial sections through a number of different embodiments of the invention.

1 is the inside and 2 the outside bearing ring. The rollers are indicated by 3. Both bearing rings are provided with annular grooves or ribs serving to take up the axial pressure, and the rollers are introduced between the rings by means of grooves or notches 4, 5 in the two bearing rings.

As indicated on Fig. 2 the rollers are provided with a head or flange 6 on one end, said part 6 fitting into grooves in the rings. As indicated on Fig. 3 the rollers may be placed alternately with their heads adjacent opposite faces of the rings 1, 2 and fit into two separate grooves 7 on each ring.

Further, as indicated on Fig. 4, the middle or narrow part of the roller 3 may be given a convex face or the corresponding part of the rings 1, 2 may be made convex as indicated on Fig. 5, in such a manner that the rollers touch each of the bearing rings in one point only.

In all cases the same method for introducing the rollers between the rings is used.

Claims:

1. In a roller bearing an outside and an inside bearing ring provided with annular grooves for taking up the axial pressure, rollers provided with heads or end flanges corresponding to the grooves of the bearing rings, said rollers being placed alternately with their heads in opposite directions and axial grooves or notches leading from the side faces of the bearing rings for introducing the rollers in the same.

2. In a roller bearing an outside and an inside bearing ring provided with annular grooves for taking up the axial pressure, rollers provided with heads or end flanges corresponding to the grooves of the bearing rings, the rollers and bearing rings being so formed that they touch each other in one point only, and axial grooves or notches leading from the side faces of the bearing rings for introducing the rollers in the same.

3. In a roller bearing an outside and an inside bearing ring provided with annular grooves for taking up the axial pressure, rollers provided with heads or end flanges corresponding to the grooves of the bearing rings, the body of the rollers having a convex surface so that it only touches the bearing rings in one point, and axial grooves or notches leading from the side faces of the bearing rings for introducing the rollers in the same.

In testimony that I claim the foregoing as my invention, I have signed my name in presence of two subscribing witnesses.

ERLING MEIER.

Witnesses:
A. HEDENSCHAU,
A. B. COOK.